United States Patent [19]

Stafford

[11] Patent Number: 4,981,541
[45] Date of Patent: Jan. 1, 1991

[54] METHOD FOR JOINING POLYOLEFIN PIPES BY FUSION

[75] Inventor: Trevor G. Stafford, Tyne & Wear, England

[73] Assignee: British Gas Corporation, London, England

[21] Appl. No.: 249,526

[22] Filed: Sep. 26, 1988

Related U.S. Application Data

[63] Continuation of Ser. No. 884,939, Jul. 14, 1986, abandoned.

[51] Int. Cl.$^5$ ............................................. B65H 69/08
[52] U.S. Cl. .................................. 156/158; 156/304.2; 156/304.6; 156/309.6; 138/120; 138/155
[58] Field of Search ..................... 156/158, 159, 304.2, 156/304.6, 309.6, 499, 503; 138/155, 120

[56] References Cited

U.S. PATENT DOCUMENTS

| | | | |
|---|---|---|---|
| 3,929,541 | 12/1975 | Spears et al. | 156/503 X |
| 4,288,266 | 9/1981 | Konrad et al. | 156/304.5 X |
| 4,640,732 | 2/1987 | Stafford | 156/503 X |
| 4,923,659 | 5/1990 | Kunz | 156/304.6 |

FOREIGN PATENT DOCUMENTS

| | | |
|---|---|---|
| 1142316 | 3/1983 | Canada. |
| 573363 | 9/1977 | U.S.S.R. . |
| 0590608 | 2/1978 | U.S.S.R. ............................. 156/158 |
| 592608 | 2/1978 | U.S.S.R. . |
| 1549169 | 7/1979 | United Kingdom . |

OTHER PUBLICATIONS

"Specification of Butt Welding for Pipes and Fitting of Polythene with a Density of at Least 930 KG/M$^3$" (Jan., 1985) VEG-GASINSTITUT, The Netherlands.
"Welding of Thermoplastics, PE-HD, Pipes and Pipeline Components for Gas and Water Mains" (Data Sheet DVS 2207, Part 1, May 1984) DVS German Welding Society.
ASTM Designation D-2513-88b, "Standard Specification for Thermoplastic Gas Pressure Pipe, Tubing, and Fittings".
ASTM designation D-2657-79, "Standard Practice for Heat-Joining Polyolefin Pipe and Fittings".

Primary Examiner—Robert A. Dawson
Assistant Examiner—Michele K. Yoder
Attorney, Agent, or Firm—Larson and Taylor

[57] ABSTRACT

Pipes, typically of medium density polyethylene for use in underground distribution systems for natural gas are joined by fusion using a very short period (25 seconds) for heating the pipe ends and a very short period (3 seconds) between separation of ends from the heater body and engagement of the ends. Those periods are such that the beads formed by upset of the softened end material of the pipes are relatively small, e.g. beads have a cross-sectional area of 10mm$^2$ for pipe for 250 mm outside diameter and wall thickness 15 mm. Typically such a bead extends only some 2.5 mm away from the adjacent pipe wall surface. Tensile, bending and impact tests show joint strength equivalent to the parent wall strength. In accelerated lifetime tests at high pressure and temperature the joints are at least equal to conventionally made joints.

4 Claims, 2 Drawing Sheets

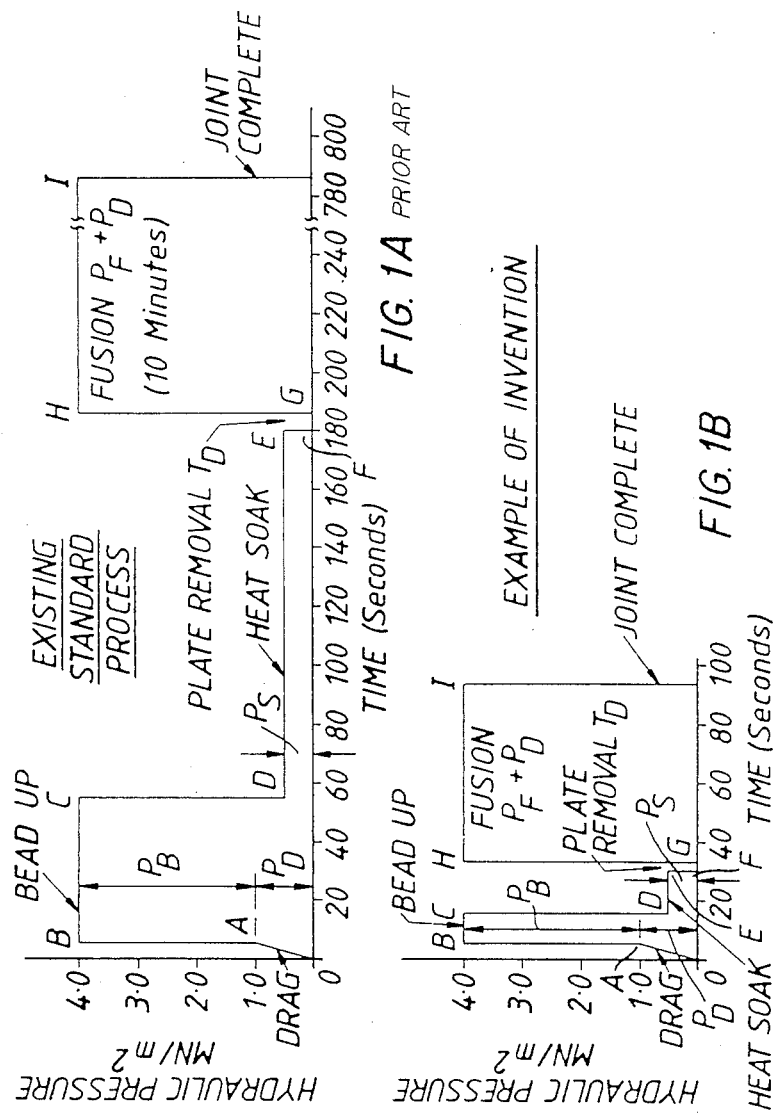

FIG. 2A PRIOR ART
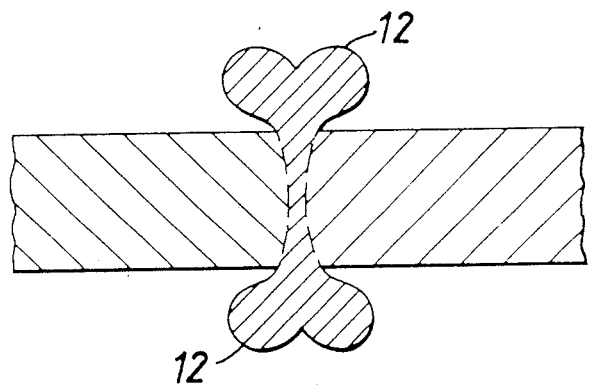
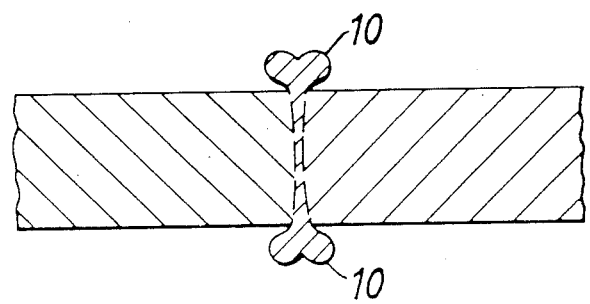
FIG. 2B

METHOD FOR JOINING POLYOLEFIN PIPES BY FUSION

This application is a continuation of co-pending application Ser. No. 06/884,939, filed July 14, 1986, now abandoned.

The invention relates to methods for joining pipes made of polyolefin plastic material.

The invention is particularly, though not exclusively, concerned with joining lengths of medium density polyethylene pipe to form distribution systems for natural gas.

The known methods for joining pipe of that kind conform to the conditions laid down in various standards, such as the VEG specification of the Netherlands, the DVS 2207 specification of West Germany or the specifications prepared by the Applicant, for example.

Those established conditions prescribe a relatively long total time during which the ends of the pipes to be joined engage the heater body and a relatively long period between the separation of the ends from the body and their mutual engagement. Accordingly, the external and internal beads at the joint, which result from the upset of the softened material of the pipes during the heating and joining periods, extend away from the pipes a relatively large distance.

The beads formed when polyolefin pipes are joined in conformity with such established conditions give rise to the following drawbacks;

(a) in many cases the external beads have to be removed: for example, where replacement gas mains are provided by installing joined polyolefin pipes in a liner tube previously installed in a passage formed by passing a burster tool through a cast iron main. The external bead prevents the entry of the replacement main into the liner;

(b) the internal beads increase the pressure drop in the gas flow through the pipe by some 10 to 20% per 6 meter pipe length;

(c) the overall time required to form each joint is relatively high, typically some 10 minutes;

(d) the beads mask the joint boundary and the heat-affected zone and hamper the interpretation of radiographs.

Methods have been proposed by which the internal bead can be eliminated or minimised, for example in British patent specification No. 1549169, Canadian patent specification No. 1142316 and Russian patent specification No. 573363. Such methods rely on the use of members within the pipes which engage the internal boundary of the joint so as to shape or remove the bead or prevent its formation.

The object of the invention is to provide a method of joining pipes of polyolefin material in which the time during which the ends of the pipes engage the heater body and the period between the separation of the ends from the body and their mutual engagement are less than the corresponding established time and period, so that the beads extend away from the pipes a relatively smaller distance.

According to the invention, a method of fusion joining pipes made of polyolefin material in which the pipe wall thickness is above 4 millimeters comprises forcing the ends of pipes to be joined against opposite faces of a heated body to form initial beads, reducing the pressure under which the ends engage the body faces, maintaining the ends in engagement with the body faces, separating the ends from the body faces and retracting the body, and forcing the ends against each other to complete the beads, the total time during which the ends engage the body and the period between separation of the ends from the body and their mutual engagement being short enough to ensure that the maximum distance which either bead extends away from the adjacent surface of the pipe wall is less than 25% of the thickness of the pipe wall.

Preferably, the total time during which the ends engage the body is not more than 25 seconds.

Preferably, the period between separation of the ends from the body and their engagement is less than 3 seconds.

Preferably, the area of a cross-section through either the outer or inner bead at a single intersection with the bead of a plane containing the central longitudinal axis of the pipes is less than 10 square millimeters.

One way of carrying out the method will now be described by way of example with reference to the accompanying drawings in which:

FIGS. 1A and 1B are diagrams showing hydraulic pressure plotted as ordinate against time as abscissa during (i) the performance of the invention used to join pipes; and (ii) a conventional method used to join similar pipes; and FIGS. 2A and 2B are diagrammatic cross-section views through two joints, made according to the conventional method and according to the invention, respectively, showing the relative bead sizes.

Considerable variations occur between the operating practices currently used by utilities to join pipes by butt fusion in various countries. The butt fusion joining process is relatively tolerant of conditions but the known practices have evolved from manual operating procedures. Such procedures dictate times of at least 6 to 8 seconds to remove the heated body, the "hotplate" so that the minimum heating time is some 50 to 60 seconds.

Typical conventional methods used in the operating regions of the Applicant's organisation are summarised below for two types of polyethylene pipes namely, a low-melt viscosity type, PEA, and a high-melt viscosity type, PE-X:

| Pipe size (nominal outside diameter) | 125 mm | 250 mm |
|---|---|---|
| Pipe wall thickness | 12 mm | 15 mm |
| Initial bead formation time (Seconds) | PEA 20–25s | 20–30s |
| Heat "soak" time (Seconds) | PE-X 40–50s | 50–60s |
|  | PEA 30s | 40s |
|  | PE-X 120s | 180s |
| Total heating time (Seconds) | PEA 50–55s | 60s–70s |
|  | PE-X 160–170s | 230–240s |
| Hotplate removal time (Seconds) | PEA 6–8s | 6–8s |
|  | PE-X 6–8s | 6–8s |
| Fusion time (minutes) | PEA 10 mins | 10 mins |
|  | PE-X 10 mins | 10 mins |

Typical bead:

| Typical bead: | | |
|---|---|---|
| Cross-sectional area | PEA 40 mm$^2$ | 40 mm$^2$ |
|  | PE-X 40 mm$^2$ | 40 mm$^2$ |
| Minimum extension away from adjacent pipe wall | PEA 5 mm | 5 mm |
|  | PE-X 5 mm | 5 mm |

In performing the method according to the invention the corresponding values for all materials and pipe sizes up to 250 mm are, for example:

| Initial bead formation time | 10 seconds |
|---|---|
| Heat "soak" time | 15 seconds |
| Total heating time | 25 seconds |
| Hotplate removal time | 3 seconds |
| Fusion time | 1 minute |

Typical bead:

| Typical bead: | |
|---|---|
| Cross-sectional area | 10 mm² |
| Maximum extension away from adjacent pipe wall | 2.5 mm |

The values just quoted are given by way of example. The plate removal time can be reduced if preferred and at least theoretically it can be only 1 second, say, when the total heating time is reduced to 10 seconds.

Successful joints have been produced using the invention, the small bead size resulting from the reduced heating time. Joint quality has been maintained in such joints because of the short plate removal time. Tensile, bending and impact tests have shown that the joints have strengths equivalent to that of the parent pipe wall. Accelerated lifetime tests at high pressure and high temperature have shown the joints to be equal, or superior, to conventionally-made joints.

The method is preferably performed using apparatus as described in the U.S. patent application Ser. No. 837,755 filed on Mar. 10, 1986, now U.S. Pat. No. 4,740,732, issued on Feb. 3, 1987 of T G Stafford assigned to the assignees hereof entitled "Apparatus for fusion joining of thermoplastic pipes". The mechanical equipment described is available from Fusion Equipment Limited of Dronfield near Sheffield. The automatic controller described is available from Integrated Hydraulics Limited, Leamington Spa, Warwickshire.

The lengths of pipe are typically each 6 meters long and are composed of medium density polyethylene. The lengths of pipe are joined on site and the pipe so formed is either laid in a trench or is inserted in a liner tube which is installed in a passage formed by the action of a burster tool on a main which is to be replaced.

The procedure for joining lengths of pipe is given in the following description, which should be read in conjunction with the description given in the United States Patent Application of Stafford aforesaid. In the case of each joint, the two lengths of pipe are clamped in respective aligned clamps of the butt fusion machine described in that application. The subsequent operation of the machine is preferably automatic, using the controller as explained in the patent application referred to above. FIG. 1 shows the regime followed in the case of the present invention.

Pressure is increased at a relatively lower rate at O-A in the hydraulic ram until one clamp moves towards the other, the electrically heated plate being positioned between the two pipe ends. The machine automatically records the pressure $P_D$ at which the clamp first moves, so that the same pressure can be applied automatically subsequently. Upon movement of the clamp, a relatively higher rate of increase of hydraulic pressure is imposed at A-B. The ends of the pipes engage opposite sides of the electrically heated plate and full pressure $P_B + P_D$, typically 4 MN/m² (40 bar) is subsequently reached at B, and is maintained at B-C, typically for 10 seconds.

The pipe ends heat up and soften and initial internal and external beads are formed at the end of each pipe under the applied hydraulic pressure of typically 10 seconds for example.

The plate is free to move transversely, so that both pipe ends are forced against the plate by the single ram. After the "bead-up" stage B-C, the pressure is reduced, for example to 0.5 MN/m² (5 bar) $P_S$ and maintained at D-E, the "heat soak" stage, typically for 15 seconds.

Next, the ram is retracted to withdraw the pipe ends from the plate, which is then automatically withdrawn from between the ends. The ram again advances and brings the ends into engagement with each other. The period $T_D$ between the separation of the ends from the plate and their engagement with each other is called the "dwell" period and is typically 3 seconds, for example. The pressure increases after the ends engage to reach a maximum fusion pressure $P_F + P_D$, typically 4 MN/m² (40 bar, for example.

The pressure is maintained during the "fusion" stage, H to I, typically for a period $T_F$ of 60 seconds during which the ends are joined and the internal and external beads are completed at the joint. After the "fusion" stage, the pressure is released in the ram and the joint cools further for a period $T_C$ typically 60 seconds.

The regime just described provides a relatively brief heating time ("bead-up" and "soak" ($T_B + T_S$)). and a very short "dwell" period $T_D$. The result is that only small beads are formed. The method is applicable to pipes in which the wall thickness is above 4 millimeters and which are made up of polyethylene, polypropylene, or other polyolefin material.

FIG. 2 shows the inner and outer beads 10 formed by the use of the invention compared with the beads 12 formed by the use of a conventional method. The cross-sectional area of the bead 10 as indicated by the cross-hatched area is typically not more than 10 square millimeters. The corresponding cross-sectional area in the case of the bead 12 is typically some 40 mm².

The distance "h" which either of the beads at 10 extends away from the adjacent surface 14 of the pipe-wall is less than 2.5 mm.

The pipes joined according to the invention have the following advantages:

(a) the small external bead at each joint avoids the need for a de-beading operation where the pipe is to be inserted in a liner, or other passage, during mains replacement or installation;

(b) the small internal bead at each joint causes a reduced pressure drop in fluid conveyed through the pipe compared with conventional beads;

(c) the method is relatively quicker than conventional methods and requires a lower heat input. The time the pipes remain in the butt fusion machine is only 1 minute or so, compared with some 10 minutes for conventional methods;

(d) the smaller beads facilitate non-destructive testing of the joints since the joint boundary and the heat-affected zone are not so extensively masked as in conventional joints.

I claim:

1. A method of fusion joining, end to end, lengths of pipe of the same diameter and wall thickness made of polyolefin material in which the pipe wall thickness is above 4 millimeters comprising:
  (a) forcing open ends of lengths of pipes to be joined against opposite faces of a heated body to form initial internal and external beads at the open heated ends of the pipe lengths;
  (b) reducing the pressure under which the ends engage the heated body faces;
  (c) maintaining the ends of the pipe lengths in engagement with the heated body faces;
  (d) separated the heated ends of the pipe lengths from the heated body faces and retracting the body; and
  (e) forcing the heated ends against each other to complete internal and external beads and to form a fusion joint between said lengths of pipe, said joint having tensile, bending and impact strength equivalent to that of the pipe wall, the total time during which the ends engage the heated body and the period between separation of the ends form the body and their engagement being short enough to ensure that the maximum distance which either the internal bead or the external bead extends away from the adjacent surface of the pipe wall is less than 25% of the pipe wall thickness.

2. A method according to claim 1, in which the total time during which the ends of the pipe lengths in steps (a), (b) and (c) engage in the body is not more than 25 seconds.

3. A method according to claim 2, in which the period between separation of the ends from the heated body in step (d) and their engagement in step (3) is less than 3 seconds.

4. A method according to claim 1, in which the area of a cross-section through either the completed internal or external bead at a single intersection with the bead of a plane containing the central longitudinal axis of the pipes is less than 10 square millimeters.

* * * * *